United States Patent
Steele et al.

(10) Patent No.: US 6,272,658 B1
(45) Date of Patent: Aug. 7, 2001

(54) METHOD AND SYSTEM FOR RELIABLE BROADCASTING OF DATA FILES AND STREAMS

(75) Inventors: William E. Steele, New Canaan; Michael Fischer, Hamden, both of CT (US); Sophia Paleologou, Astoria, NY (US)

(73) Assignee: KenCast, Inc., Stamford, CT (US)

( * ) Notice: Subject to any disclaimer, the term of this patent is extended or adjusted under 35 U.S.C. 154(b) by 0 days.

(21) Appl. No.: 09/179,083

(22) Filed: Oct. 27, 1998

Related U.S. Application Data

(60) Provisional application No. 60/063,069, filed on Oct. 27, 1997.

(51) Int. Cl.[7] ................................................. H03M 13/00
(52) U.S. Cl. ............................ 714/752; 714/776; 370/474
(58) Field of Search .................................... 714/751, 752, 714/762, 763, 774, 776; 370/474

(56) References Cited

U.S. PATENT DOCUMENTS

| | | | |
|---|---|---|---|
| 4,718,066 | * | 1/1988 | Rogard ................................. 714/751 |
| 5,485,474 | * | 1/1996 | Rabin ................................... 714/762 |
| 5,600,663 | * | 2/1997 | Ayanoglu et al. ..................... 714/774 |
| 5,631,907 | * | 5/1997 | Guarneri et al. ...................... 370/474 |

* cited by examiner

Primary Examiner—Emmanuel L. Moise
(74) Attorney, Agent, or Firm—Fitzpatrick, Cella, Harper & Scinto

(57) ABSTRACT

A system and method for transmitting information between a host computer and one or more subscriber computers via a satellite is provided. One or more live streams of data representing the information are inputted in the host computer. The respective pacing factors are measured from the live data streams. The respective virtual files are created from the live data streams. The virtual files are packet-encoded to generate respective streams of encoded packets. The streams of encoded packets and pacing factors are transmitted to the subscriber computers via satellite.

8 Claims, 7 Drawing Sheets

METHOD AND SYSTEM FOR RELIABLE BROADCASTING OF DATA FILES AND STREAMS

CROSS-REFERENCE TO RELATED APPLICATIONS

This application claims the benefit of U.S. Provisional Application No. 60/063,069, filed Oct. 27, 1997.

BACKGROUND

Today, the availability of powerful digital computational tools has yielded the ability to present information in forms that go far beyond text and numbers. There now exists the capability to create and share data in more complex multimedia forms, using graphics, audio, still images and moving images (video), as well as combinations of those forms. This data may be a well-defined group of bits, such as a graphics/text file, an audio file or a still image file. The data may also be a real-time or near real-time bit stream of bits, such as that generated by live video, audio, or financial data.

Whether in file or stream format, however, multimedia data generally is far larger in size than text data. For example, whereas a conventional text file usually occupies less than 50 Kilobytes (Kbyte), just one minute of compressed video requires up to 10 Megabytes (Mbyte), almost 200 times larger in size. The presentation of information in multimedia form therefore creates two problems—storage and communication. Storage has improved dramatically over the past few years. For example, personal computers (PCs) can now store inexpensively many Gigabytes (Gbyte) of data, and the cost-per-Gbyte is becoming less expensive every day.

Communications, however, remain a problem. Historically, the oldest method of distributing large amounts of information has been printed material, usually in the form of magazines and books. However, this method is relatively expensive, takes days to complete, is limited to presenting data in text, pictorial or graphic form, and is difficult to update or change. Distribution of information via audio cassette or video cassette, while less costly and allowing information to be presented in audio and video form, is still relatively slow in that shipment of the physical item containing the information must take place, the cassette itself still makes it relatively difficult to update and change the information, and is incapable of communicating live video and audio.

More practical than printed material and cassettes, graphics, music and other information may be digitized into computer data files, referred to as "large digital objects," which in turn may be transferred from a host computer to a potentially large number of subscriber computers. One common way of transferring data files is via a public or private computer network, in which the data files are transmitted by the host computer and received by the subscriber computers over phone lines via a modem. Although distribution via modems may work well for multi-Kbyte files, transmitting multi-Mbyte data files is impractical even when using the fastest modems, because the transmission speed of modems is constrained by the relatively low bandwidth of the telephone lines. For example, reliably retrieving just one large data object using the Internet, or other public or private networks, even when using ISDN lines, may take many minutes to many hours, and is relatively expensive.

To avoid overloading expensive private networks, many companies distribute large text files and other large digital objects using CD-ROM disks, each of which can hold, for example, up to 660 Mbytes of data. While the cost of distribution is moderate in comparison to using a network, the distribution of CD-ROM disks suffers from one major drawback shared by the oldest methods of information distribution—it can take one or more days, in comparison to the theoretically near-instantaneous communication potential that digital information should enjoy. Further, to update this CD-ROM based information, new CD-ROMS must be provided, usually from every three months to a year.

Moreover, none of the above-described communication methods can be used to communicate quickly, efficiently and reliably streams of live data. For example, video may be stored on videotape prior to broadcast ("tape delay"). This is not acceptable, however, when users require the video immediately. Digital communication of live video or audio via the Internet is slow, unreliable and unwieldy. Traditional analog communication methods such as TV and radio, as well as the proposed digital TV, although quick and efficient, are very susceptible to noise and interference.

To overcome some of the problems associated with the above methods of distribution, distributors of large data files or long data streams are turning to satellite broadcasting. Satellite broadcasting provides not only distribution over large geographical areas, for example, the entire United States and Canada, but potentially has the high bandwidth capacity required to transmit large amounts of data at high speeds, thus reducing the transmission time to seconds. Moreover, the cost of satellite broadcasting, on a per-user basis, is comparatively less than the respective costs of the above methods.

One type of satellite broadcasting is one-way satellite broadcasting. A one-way broadcast satellite system, shown in FIG. 7, transfers data from a host computer 1 to a satellite transmitter device 2. The satellite transmitter device 2 in turn transmits, through an uplink antenna 4, the data to a satellite 5 using digital modulation techniques well-known in the art. The satellite 5 retransmits the data to one or more downlink antennas 6 and satellite receiver devices 7. The satellite receiver device 7 transfers the data to the subscriber computer 8.

One notable drawback of one-way satellite broadcast systems, however, as compared to some other methods of information distribution such as the above-described computer networks, is the inability of the subscriber computers to inform the host computer that a reception error has occurred. For example, if the information is live video, the display of the receiver will simply "freeze up" if an error is encountered, unable to continue until a correct frame of video is received. Thus, it is essential that the transferred data files or streams be received in perfect condition, or capable of being reconstructed to be in perfect condition, at all the subscriber computers.

The above drawback of one-way satellite broadcasting is further compounded, however, by the greater vulnerability of the broadcast signal to various forms of noise interference present in the transmission channel. One form of noise that is always present in the channel is "white" noise. For example, white noise is introduced in the satellite channel by the thermal radiation of the gaseous constituents of the earth's surface. The strength and frequency of this noise varies, and it sometimes overpowers the transmitted signal causing it to be received erroneously. Because of white noise, a transmitted binary "zero" bit is occasionally received erroneously as a binary "one" bit, and vice-versa. Such errors are known as bit errors. White noise generally tends to cause isolated bit errors in a transmitted message.

Although these bit errors are usually spread out throughout the message, they can be easily detected and corrected, because they are isolated. In contrast with white noise, "impulse" noise tends to wipe out long sequences of consecutive bits. Such errors are known as "burst" errors. Their duration varies from a few milliseconds to a few seconds, but certain phenomena, such as rainstorms or sunspots, can cause burst errors of even longer duration such as a few minutes. Unlike bit errors due to white noise, burst errors are not distributed over the entire message, but only a portion thereof. However, burst errors are more difficult to detect and correct, because they wipe out so many consecutive bits of data.

Well-known error detection and correction (EDAC) schemes are used to reduce the effects of errors caused by white noise. EDAC generally operates at the bit level by adding enough redundant data bits to the data to detect and correct the received data. In practice, EDAC can only detect and correct a limited amount of bit errors. The redundant data added to the original data, however, obviously increases the amount of data to be transmitted and thus the transmission bandwidth and transmission time. Well-known EDAC schemes include Hamming, Viturbi, Reed-Solomon, and other forward error correction (FEC) coding schemes. Interleaving may also be performed at the bit level. Interleaving rearranges the data bits so that they are non-sequentially transmitted. The subscriber computer deinterleaves the received bits to reorder the bits as they originally appeared. This technique reduces the effect of errors in a sequence of bits. Although interleaving does not in itself correct those bit errors, by non-sequentially reordering the data bits in a block of data that is to be transmitted by the host computer, the bit errors are more uniformly distributed over the received block of data upon deinterleaving by the subscriber computer. By isolating the bit errors, interleaving enhances bit-level EDAC coding performance. Both EDAC and interleaving can also be performed on data symbols representing groups of bits, such as bytes.

In satellite broadcast systems, the transmitted data bits or symbols are most likely to be organized into large groups called packets, and a large data file is transmitted as a sequence of packets. The addressed subscriber computers reconstruct the large data file from the received packets. The above-described noise bursts, especially those due to rainstorms and sunspots, can typically damage one or more long sequences of consecutive packets. Those packets are either not received by one or more of the subscriber computers or are received severely corrupted. Although bit-level EDAC schemes might be able to correct some of the corrupted packets, depending on the number of erroneous bits in those corrupted packets, these schemes are simply not robust enough to correct the great majority of those corrupted packets. This is because, in extended periods of burst noise, a large amount of both the original data bits and redundant EDAC bits in a packet are received corrupted, thus making bit-level error correction, and thus packet-level error-correction, impossible. Moreover, EDAC schemes are useless in the case of those packets not received.

One known method for reducing the effect of burst errors in satellite broadcast systems is retransmission of those packets that were not received or were received corrupted and could not be corrected (hereinafter those packets are simply referred to as "lost"). For example, a host computer may broadcast via satellite to two geographically widely-separated subscriber computers A and B. Due to this wide separation, subscriber computer A and subscriber computer B may experience different weather conditions, and thus different patterns of noise. For example, subscriber computer A may lose 20% of the transmitted packets, while subscriber computer B may successfully receive all the transmitted packets. Although it is possible to rebroadcast the entire file to all the subscriber computers, this method is costly, wastes time and bandwidth, and prevents the satellite channel from being used for other purposes. In the above example, subscriber computer A would identify the lost packets (by examining the serial numbers of the correctly received packets) and would ask the host computer to retransmit the packets it missed until the entire large data file could be reconstructed perfectly by subscriber computer A. The request for missed packet retransmission is made through a back channel, and the host computer rebroadcasts those missed packets via satellite. Alternatively, the host computer retransmits those missed packets only to subscriber computer A through the back channel.

Retransmission of lost packets requires, however, (1) two-way communication back channels from all of the subscriber computers to the host computer so each subscriber computer can inform the host computer of which packets were lost, and (2) a retransmission protocol between the host computer and the subscriber computers. Each back channel usually takes the form of a modem and telephone lines, or is part of a standard computer network. The back channel therefore has a limited bandwidth and can timely transmit only a limited amount of information. Back channels are also expensive. Further, retransmission increases the time required to distribute the data, and prevents the host computer and subscriber computers from doing other tasks. In some applications, such as a mobile receiver, use of back channels may simply be impossible.

A reliable and efficient method for transferring large data files over a one-way broadcast satellite system to overcome many of the above-described problems is described in U.S. Pat. No. 6,012,159 (which, however, is not admitted to be prior art with respect to the present invention by its mention in this Background section). In that method, the data file to be broadcast is arranged into a first set of (original) packets in a host computer. A second set of packets, derived from the first set of packets, are transmitted by the host computer to the subscriber computers, which in turn receive all or some of the transmitted packets. Because of the innovative packet encoding technique described in that application, as long as the number of received packets is greater or equal to the number of original packets, the subscriber computer is able to reconstruct the entire original data file from the received packets. The techniques for encoding the transmitted packets from the original packets, and for decoding and reconstructing the original packets from the received packets, are set forth in that application and are incorporated herein by reference.

Although the packet-level encoding/decoding method of U.S. Pat. No. 6,012,159 provides for the reliable transfer of large data files from a host computer to one or more subscriber computers, broadcasting live data streams, as well as both data streams and files simultaneously, still presents a challenge, as follows. First, live data streams are not well-defined in size like data files, and thus, encoding and decoding stream data becomes a difficult task. Moreover, broadcasting live data streams, unlike static data files, requires the derivation of "pacing" information so that the data stream can be buffered and "played out" at the receiving end at the same rate it was generated at the transmitting end. This problem has not yet been addressed in any of the above-described communication methods. Further, control data may also be broadcast to control transmission by the transmitter, retransmission by the satellite and reception by the receiver. Authorization data that designates which subscribers are allowed to receive the broadcast data may also be required. Generally, control and authorization data are sent as a group of unencoded bits or packets preceding the information packets. An ill-timed noise burst, although not effecting the information packets, may wipe out most or all of this control or authorization data, which in turn may prevent the correct reception of the unaffected information data. This problem has also not been addressed in the any of the above-described communication methods.

SUMMARY OF THE INVENTION

The present invention relates to a method and system for reliably broadcasting data files and/or streams. In particular, the present invention provides a method and system for communicating data which ensures that large, multimedia data files, such as digitized music, graphics and still images, and data streams, such as digitized live video, audio and financial information, may be received error-free, or reconstructed to be error-free, despite the effects of various types of noise interfering with the transmitted signal.

BRIEF DESCRIPTION OF THE DRAWINGS

The various aspects of the present invention can be best understood by reference to the detailed description of the preferred embodiments set forth below taken with the drawings, in which.

DETAILED DESCRIPTION OF THE PREFERRED EMBODIMENTS

The data broadcast by the system of the present invention generally takes two forms, depending on the source of the data. First, the data may be a well-defined group of bits forming a data file, for example, a conventional text file, a graphics file or a digitized image or audio file. This will be referred to as "file" data. Second, the data may be a continuous stream of bits, such as that generated by live video, audio, or financial data, which will be referred to as "stream" data. Of course, one skilled in the art will readily recognize that file and stream data are not limited to the above examples, but may be derived from other sources. Further, the data may be from a combination of data sources, such as a combined text and graphics file or a combined video and audio stream.

The file and stream data may also be characterized by how it is processed. Data originating at the transmitting (host) side as a file and processed solely as a file will be referred to as a "file/file", while data originating at the host as a stream and processed "on-the-fly", will be referred to as a "stream/stream". In addition, as will be described in more detail below, some data may originate at the host as a stream, be converted into a file at some point in the encoding process and stored, and then be reconverted and broadcast as a stream. This data will be referred as "stream/file" data. Similarly, stream/stream data will be converted into a "virtual file" before being reconverted and broadcast as a stream. This data will be referred to as "stream/virtual file" data.

Figure 1:
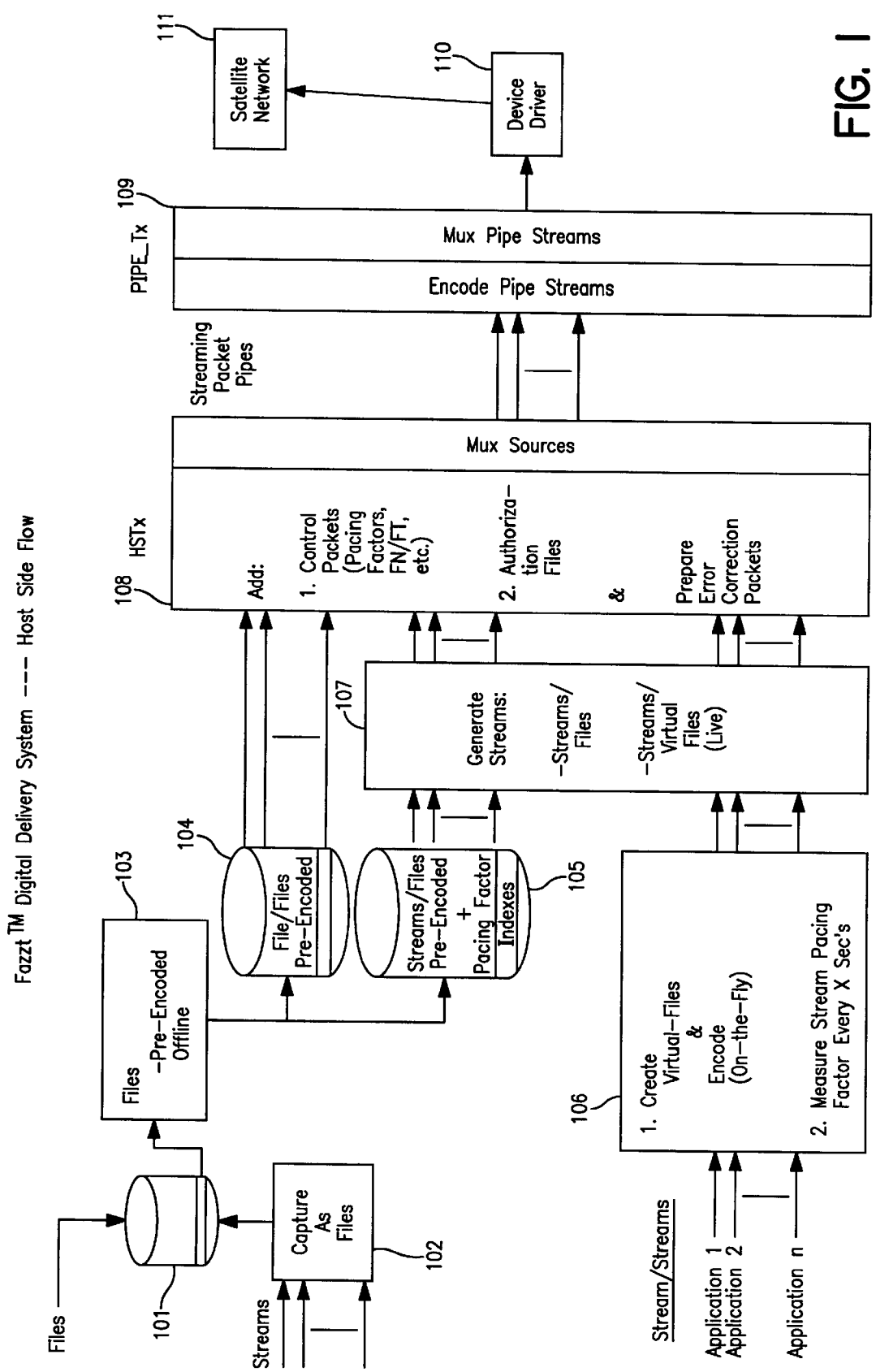
FIG. 1 depicts a block diagram of the transmitting (host) side of a one-way broadcast satellite system according to the present invention.

FIG. 1 depicts a block diagram of the host computer side of a one-way broadcast satellite system according to the present invention. The host computer 100 receives or generates data files. These files are stored in file memory 101. In addition, when real-time performance is not a requirement, the host computer may also receive one or more data streams and capture them, via file capturer 102, as files. Those stream/files are also stored in file memory 101. The file/files and stream/files are pre-encoded offline by pre-encoder 103 at the packet level using the techniques of U.S. Pat. No. 6,012,159. The pre-encoded file/files may be stored back into the file memory 101 or into a separate memory 104, as shown. The pre-encoded stream/files may also be stored back into the file memory 101 or a separate memory 105, as shown. At this point, the original file/files or stream/files have been transformed into encoded file/files packets or stream/files packets.

In the case of stream/files, since the data originated as a stream, pacing factors must also be computed and stored therewith, such as in the file header packet. These pacing factors will eventually be used by the receiving subscriber computer to output the received and decoded data stream at the same average rate or "pace" that it entered the host computer. To compute the pacing factors, as the data enters the host computer, the number of entering data bits are counted every certain number of seconds, for example, every ten seconds. If 300,000 bits are counted in a first ten-second period, an average pacing factor of 30,000 bits per second (bps) would be computed for that first portion of the bit stream and stored in the file header packet as such. This would continue for the entire length of the bit stream. Continuing the example, a second 10-second portion may have an average pacing factor of 20,000 bps, while a third 10-second portion may have a 75,000 bps average pacing factor, and so on. Those pacing factors are stored together with the first pacing factor. Upon playback of the stream data at the receiver, the first 10-second first portion would be played back at a 30,000 bps rate, the second 10-second portion at the 20,000 bps rate, the third 10-second portion at the 75,000 bps rate, and so on until the entire bit stream has been played back. Of course, the interval over which the pacing factor is computed may be more or less than 10-seconds, depending on the source of the data, and need not be uniform over the entire bit stream, so long as the temporal relationship between the computed pacing factor and the data stream is sent to, or already known by, the receiver.

In the case of stream/streams data, one or more bit streams may enter the host computer from a respective number of applications (1, 2, . . . , n). For each received bit stream, a stream encoder 106 reorganizes every certain number of bits (or 8-bit "bytes") into a virtual file. Thus, the live bit streams are continuously partitioned into respective virtual files. The encoder 106 also computes the pacing factors for every X second portion of each incoming bit stream, and stores the pacing factors therewith, as described above. The encoder

106 encodes on-the-fly the stream/virtual files at the packet level using the techniques of U.S. Pat. No. 6,012,159. At this point in the host side, the original stream/streams have been transformed into encoded stream/virtual files of packets.

Figure 3:
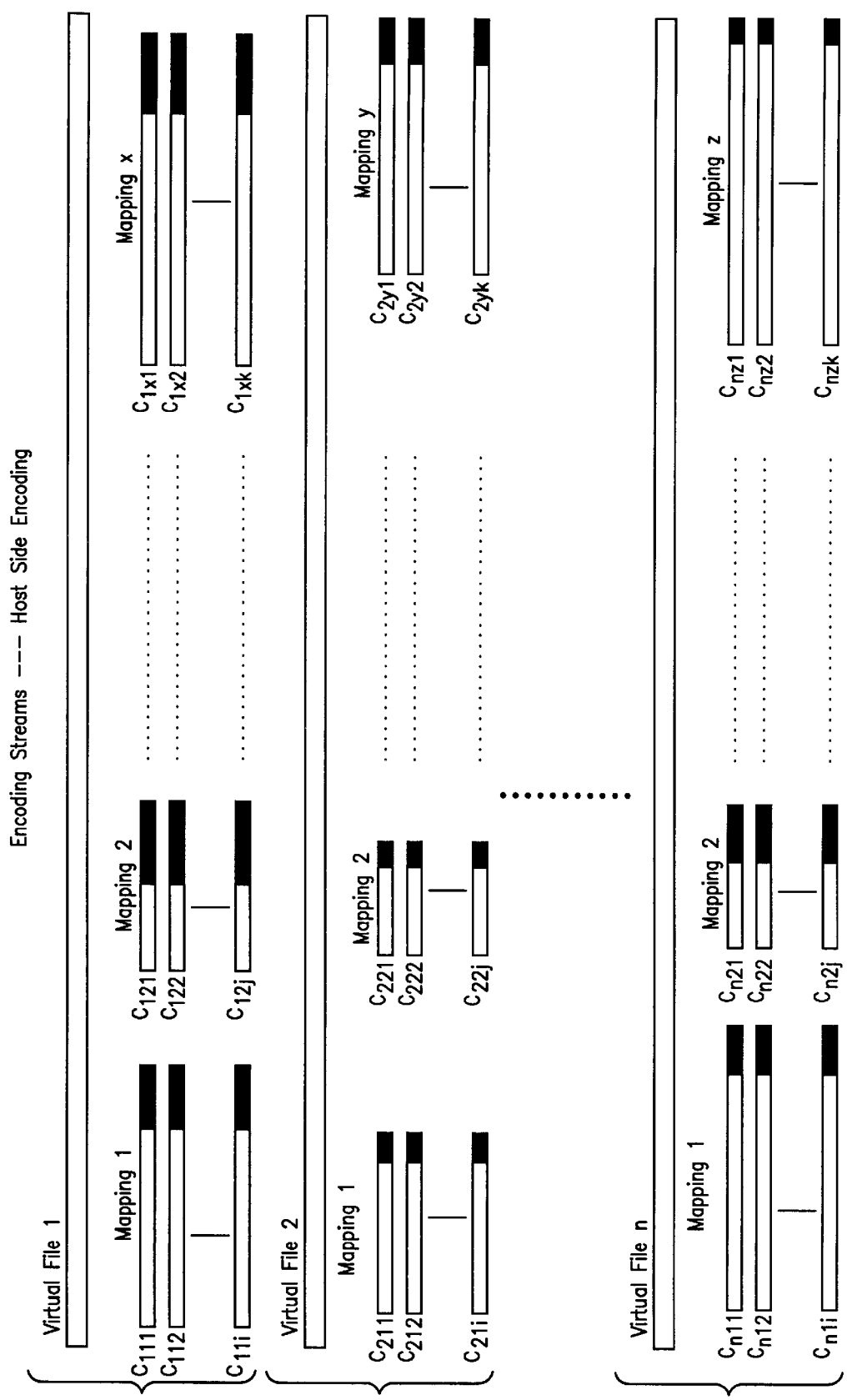
FIG. 3 depicts an example of stream encoding in the host side according to the present invention.
Figure 5:
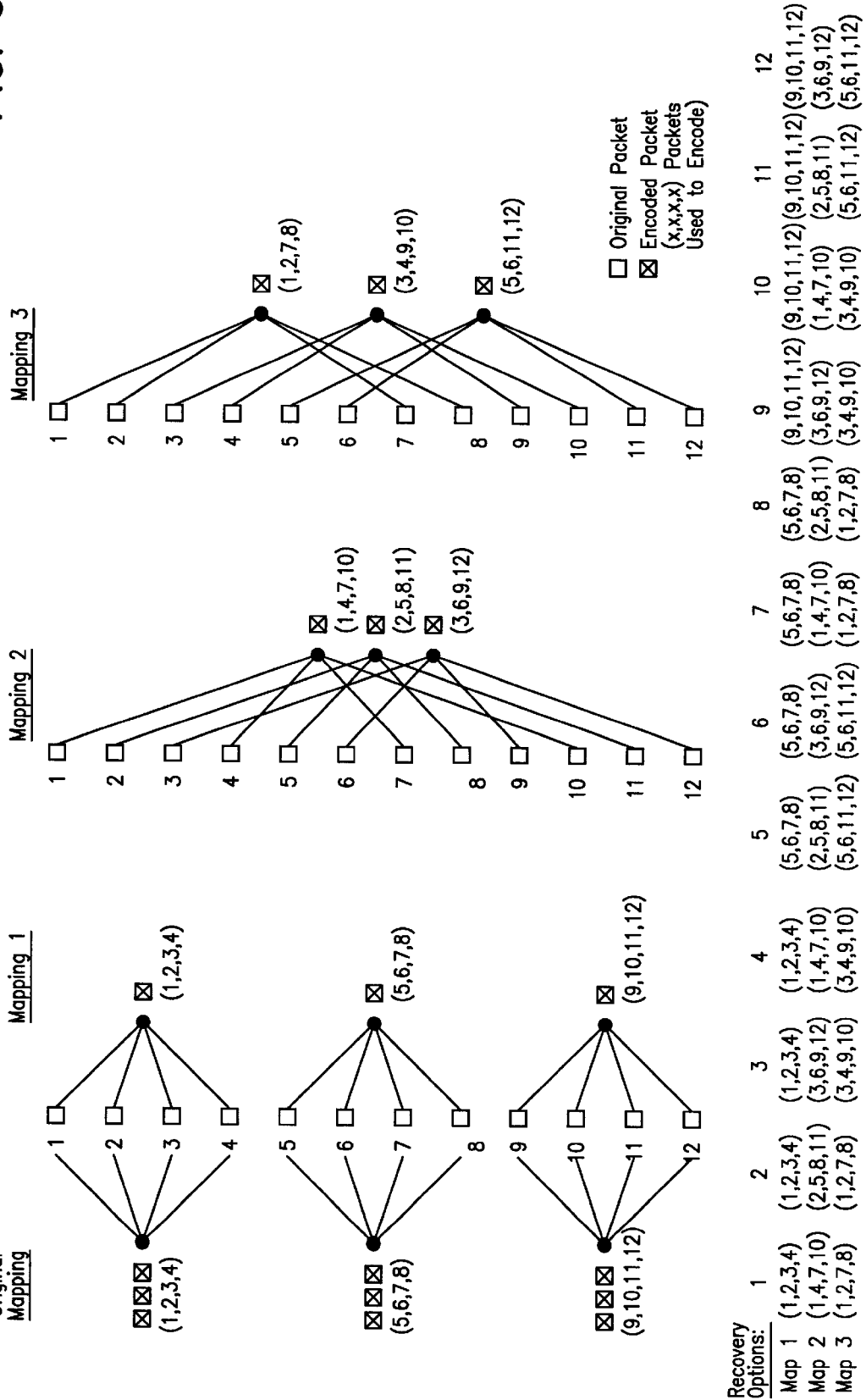
FIG. 5 depicts examples of packet mapping on the host side and packet recovery on the subscriber side according to the present invention.

An example of stream/virtual file encoding is shown in FIG. 3. Each virtual file number corresponds to an incoming stream/stream of respective applications 1 through n. In a first time period, designated as "Mapping 1", a certain amount of data will enter the host computer for each bit (or byte) stream, and, if the pacing differs, a different amount of data will enter for each stream. Thus, the amount of data in Mapping 1 of Virtual File 1 may differ from that of Virtual Files 2 through n, as shown by the "white" portions in FIG. 3. The data collection time period may or may not coincide with the pacing factor time interval. If they do coincide, then each mapping will have one corresponding pacing factor. The bytes are then collected into packets, for example, 1024 bytes to one packet. As shown in FIG. 3, the packets may be grouped in varying numbers of rows of packets, for example, $c_{nmi}$, $c_{nmj}$, or $c_{nmk}$, where n is the virtual file number, m is the mapping number, and i, j, and k are row numbers. Each mapping is of a definite size and shape, as will be explained in more detail below, and can be encoded at a desired encoding level using the techniques of U.S. Pat. No. 6,012,159. In FIG. 3, the original packets are shown in white, while the extra packets generated during encoding are shown in black at the end of each row of original packets, when using a standard form code generator matrix in the packet-level encoding, as shown in FIG. 5 of U.S. Pat. No. 6,012,159. As shown in FIG. 3, different encoding levels and schemes may used on different mappings, so the proportion of extra black packets to original white packets may vary from mapping to mapping as well as from virtual file to virtual file. Also, since the length of stream/streams may vary, their corresponding virtual files will have a different number of mappings. For example, Virtual File 1 has "x" number of mappings, Virtual File 2 has "y" number of mappings, and Virtual File has "z" number of mappings.

FIG. 5 depicts an example of packet mapping on the host side according to the present invention. In one scheme ("original Mapping") chunks of four packets each (marked by a box) are used for encoding, resulting in 3 encoded packets per chunk (marked by boxes with an "x"). If twelve packets are taken in each chunk instead of four, and if all twelve packets are used at once to encode, the amount of error correcting encoding and the processing time would increase significantly nonlinearly. Bandwidth may be preserved, processing time may be reduced and better protection against noise may be provided when using larger-sized chunks of packets by instead computing a single encoded packet many times over, as follows. In Mapping 1, packets 1, 2, 3 and 4 are grouped for encoding, resulting in a first encoded packet. Packets 5, 6, 7 and 8 form a second group resulting in a second encoded packet, and packets 9, 10, 11 and 12 form a third group resulting in a third encoded packet. This technique of grouping four packets at a time and computing an encoded packet is repeated to provide an additional 6 encoded packets as shown in Mappings 2 and 3, in which different combinations of packets are used to encode (for example, the fourth encoded packet is generated from the combination of packets 1, 4, 7 and 10). The overall result is 9 encoded packets, which is the same number of encoded packets of the original Mapping, thus preserving bandwidth. But since only four packets are taken at a time to produce one encoded packet rather than three, processing time is reduced, even though three mappings (Mappings 1, 2 and 3) are required instead of 1 (the original Mapping). That is, in the current example, 3 chunks of four packets with 3 encoded packets per chunk takes longer to process and provides less protection than 1 chunk of twelve packets with 9 encoded packets when the 9 encoded packets are generated as described above. Recovery (decoding) options are summarized in the table shown at the bottom of FIG. 5.

The encoded stream/files and the encoded stream/virtual files of packets are next converted into corresponding streams of packets by stream generator 107. Each encoded packet stream also has a corresponding set of pacing factors. In the case of a stream/file, the entire pre-encoded stream/file is converted into a packet stream; in the case of a stream/virtual file, the encoded mappings are converted on-the-fly to a packet stream.

In summary, by partitioning dynamic data streams into definitely-sized files or virtual files of packets, file-oriented packet-level encoding may be applied to the data to generate encoded files, which are then converted into packet streams for eventual transmission. At the same time, pacing factors may be computed and stored in additional (control) packets to provide proper playback of the streams at the receiver. As a note, the pre-encoded file/files do not require any conversion to streams by stream generator 107 since they are to be treated, by definition, as files and not streams. However, the present invention provides integral broadcasting of the encoded file/files packets with the encoded, packet streams, as will be described below.

In addition, to provide for a robust and reliable broadcast, it is also desirable to add control and authorization packets to the information packets (i.e., the encoded file/files packets and the encoded packet streams) and to encode those control and authorization packets as well. Control data includes the pacing factors, as computed above, FN/FT, etc. Authorization data includes identification codes of subscribers authorized to receive the data.

Figure 4:
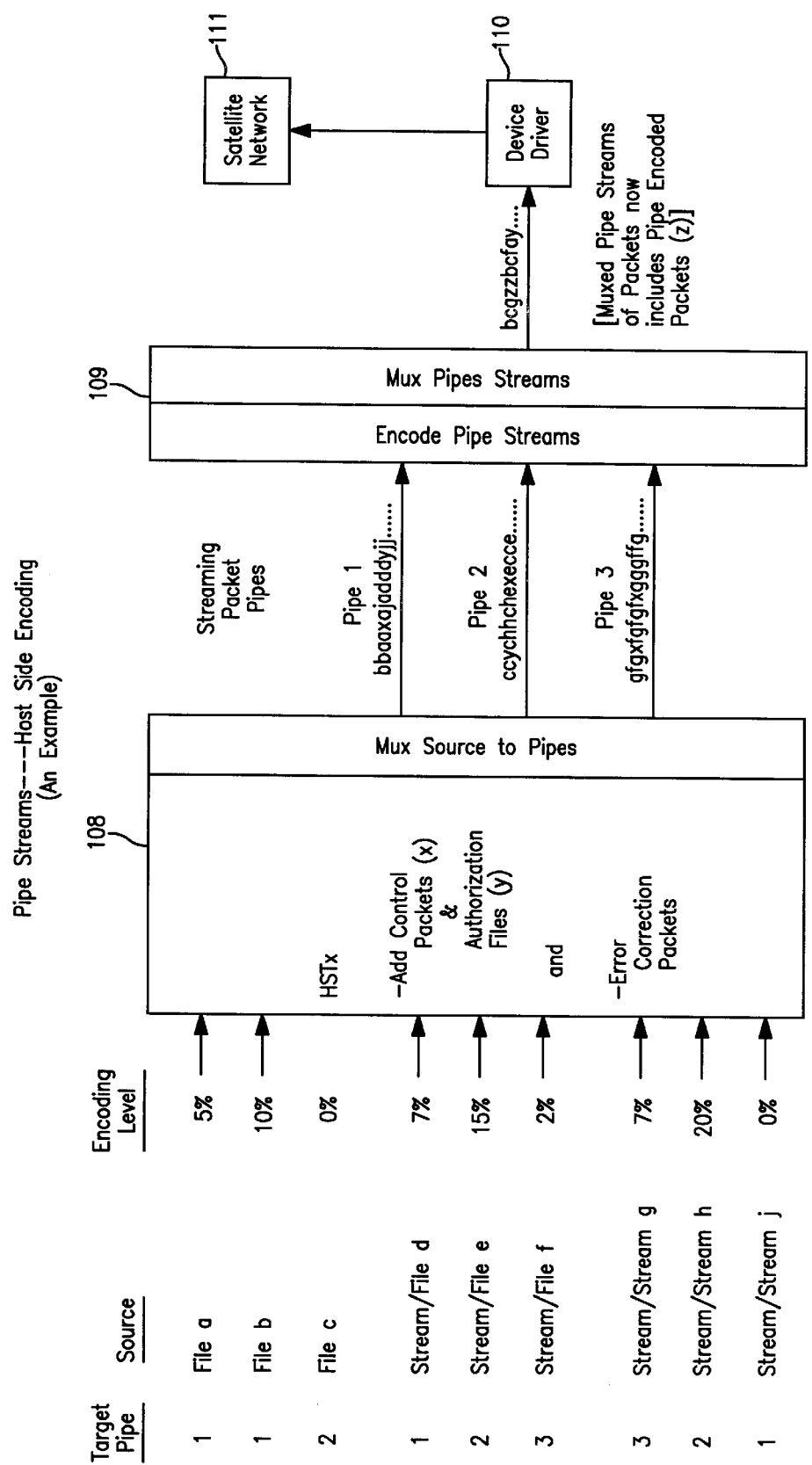
FIG. 4 depicts an example of stream piping in the host side according to the present invention.

These functions are performed by the high speed transmitter (HSTx) 108. HSTx 108 adds the control and authorization packets in an interleaving fashion to the encoded information packets, as follows. As shown in FIG. 4, each source of information, whether file/files, stream/files or stream/streams, is assigned a target pipe, where a pipe is a stream of multiplexed packets output from the HSTx 108. Each file, stream/file and stream/stream (via a stream/virtual file) has been encoded at the desired encoding level, thus producing an extra number of error-correction packets. As the encoded file packets (from memory 104), stream/file packets (from stream generator 107), and the stream/stream packets (also from stream generator 107) enter the HSTx 108, they are multiplexed to their target pipe. For example, packets from encoded file/file a, file/file b, stream/file d and stream/stream j are targeted to pipe 1. In a predetermined fashion, control packets "x" and/or authorization packets "y" are added to pipe 1 with the packets from encoded sources a, b, d, and j (also designated as "a", "b", "d" and "j"). For example, pipe stream 1 may contain a sequence of packets "bbaaxajadddyjj . . . ". Similarly, file/file c, stream/file e, and stream/stream h are targeted to pipe 2. As they enter, packets from these sources as well as some control packets "x" and authorization packets "y" are sent to pipe 2. Thus, pipe stream 2 may contain a sequence of packets "ccychhchexecce . . . ". Also, stream/file f and stream/stream g may be assigned to pipe 3. Thus, pipe 3 may contain a sequence of packets "gfgxfgfxgggffg . . . ". Notably, no pipe contains packets from an unassigned source. Also, each pipe may contain one or more control and authorization packets. Thus, control and authorization packets are (1) temporally distributed over a single pipe, and (2) distributed over multiple pipes, both of which provide protection against destruction of those packets from a burst of noise. Of course, the number of pipe streams may be more or less than three, and the pipe assignments shown in FIG. 4 are merely illustrative and may change as determined by the operator of the host computer.

An additional level of error correction encoding may be provides at the pipe stream level so that the control and authorization packets distributed into the pipe streams may be protected like the information packets. Each pipe stream enters a pipe transmitter (Pipe$_{13}$ Tx) 109. The pipe streams are now treated, at a packet level, like application streams, and packets from each pipe stream are collected into respective "pipe/virtual files". The pipe virtual files are encoded in a similar fashion to the stream/virtual files described above, for example, using a file encoding technique described in U.S. Patent Application No. 6,012,159. After encoding, the pipe streams will have extra pipe-level error-correction packets, designated as "z" in FIG. 4. The packets from the encoded pipe streams, including the extra "z" packets, are then multiplexed by Pipe$_{13}$ Tx 109 to produce a single pipe stream. The multiplexer sequentially outputs the packets from each of the encoded pipe streams to produce a sequence of packets, for example, the sequence "bcgzzbcfay . . ." shown in FIG. 4. One skilled in the art will appreciate that other forms of multiplexing may be implemented instead, such as taking the packets two at a time from each pipe stream. Thus, if one or more of the control or authorization packets are loss due to noise, they may be perfectly reconstructed from the correctly received pipe packets, so long as the number of correctly received pipe packets is greater or equal to the number of original pipe packets, for a given pipe/virtual file from which the encoded pipe packets were derived.

The multiplexed, encoded pipe stream is output from the Pipe__Tx 109 to a device driver 110 in the host computer 100. The device driver 110 sends the packets of the multiplexed, encoded pipe stream to satellite network hardware 111 for broadcast to a satellite. Those packets are then retransmitted by the satellite to one or more receiving subscribing computers.

Figure 2:
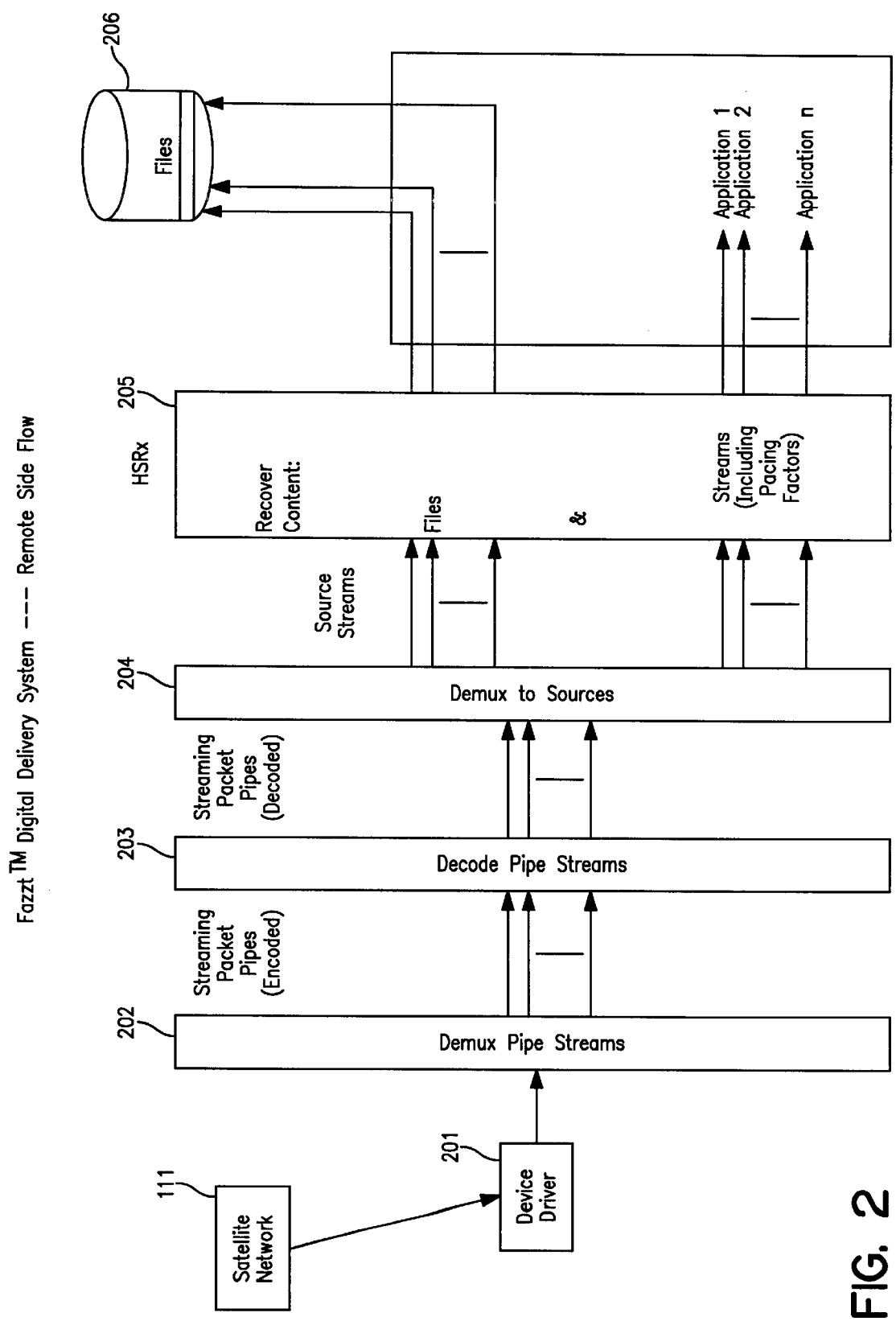
FIG. 2 depicts a block diagram of the receiving (subscriber) side of a one-way broadcast satellite system according to the present invention.

FIG. 2 depicts a block diagram of the subscriber (remote) side of the one-way broadcast satellite system of the present invention. The subscriber computer may receive all of the transmitted pipe packets, or because of noise, receive only some of the pipe packets. Those packets are transferred to a device driver for input to a pipe stream demultiplexer 202. The pipe stream demultiplexer demultiplexes the pipe packets to their respective pipe streams. Because packets may be lost in transit, a decommutator-style demultiplexer may not be feasible. However, one way of demultiplexing is to decode a pipe stream identification number sent with each transmitted packet in its header. The pipe stream identification number would identify to which pipe the packet belongs. The output of the pipe stream demultiplexer 202 are the same as the transmitted pipe streams, less any packets lost due to noise and interference.

Next, the individual pipe streams are decoded in the pipe stream decoder 203. The pipe stream decoder rearranges the packets for each pipe stream into a pipe/virtual file corresponding to that used on the transmitter side to generate the error correcting pipe packets. Unlike the pipe/virtual file on the transmitter side, the pipe/virtual file on the remote side might be missing packets lost in transmission or otherwise uncorrectable, which will treated as if actually lost. However, most or all of the original pipe packets can be reconstructed from the received pipe packets if the number of received pipe packets for that pipe/virtual file is greater than or equal to the number of original packets for that pipe/virtual file, in accordance with the packet-level decoding method of U.S. Pat. No. 6,012,159. Assuming this is the case, after the pipe-level decoding has been completed, the pipe stream decoder 203 outputs the reconstructed original pipe stream packets. If all the original pipe stream packets are present, then no further decoding is required. However, some lost packets may not have been reconstructed via the pipe stream decoding, and must be reconstructed via a second stage of decoding.

The decoded pipe streams would enter a pipe-to-source demultiplexer 204 that would rearrange the pipe streams into their original sources, that is, either file/files, streams of stream/files, or streams of stream/streams. One way of demultiplexing the pipe streams to their sources is to decode a source identification number sent with each transmitted packet in its header. The source identification number would identify to which source the packet belongs. The output of the packet-to-source demultiplexer 204 are the same as the sources on the transmitter side, less any packets lost unreconstructable by the pipe stream decoder 203. The packet-to-source demultiplexer 204 also separates from the source (information) packets the control and authorization packets. If the pipe stream decoding was successfully completed, then any lost control and authorization packets will have been reconstructed at this point.

The packets of each of the sources, as well as the control and authorization data, are input to the high speed receiver (HSRx) 205, which recovers the content of the file/files, stream/files and stream/streams, as well as checks and operates on the control and authorization data. Each file/file is packet-level decoded, in accordance with the packet-level file decoding technique described in U.S. Pat. No. 6,012,159. For each file or virtual file, all of the original packets will be reconstructed from the received packets if the number of received packets is greater than or equal to the number of original packets.

As for the stream/file and stream/stream sources, the HSRx 205 first rearranges the streams into files and virtual files, respectively. Those files and virtual files correspond to those on the transmitter side, except that any lost packets will be missing from them. The files and virtual files are also packet-level decoded in accordance with the packet-level file decoding technique described in U.S. Pat. No. 6,012,159. For each file or virtual file, all of the original packets will be reconstructed from the received packets if the number of received packets is greater than or equal to the number of original packets. Any other decoding, such as transforming the packets into a sequence of bits or bytes, may also be performed.

The HSRx 205 would also associate the pacing factors from the decoded control packets to their respective stream/file data or stream/stream data. Upon successful decoding, the HSRx 205 outputs the original file/file, stream/file and pacing factors or stream/stream data and pacing factors, to a memory 206, or to an output device, including, but not limited to, a video circuit and display, an audio circuit and speaker, or a printer. In the case of stream data, the output device uses the pacing factors to output the data at the average rate dictated by the pacing factor.

Bit-level encoding using conventional EDAC techniques may also be performed on the packets prior to transmission. In this case, corresponding bit-level decoding would be performed to detect and correct bit level errors upon reception by the subscriber computer.

Figure 6:
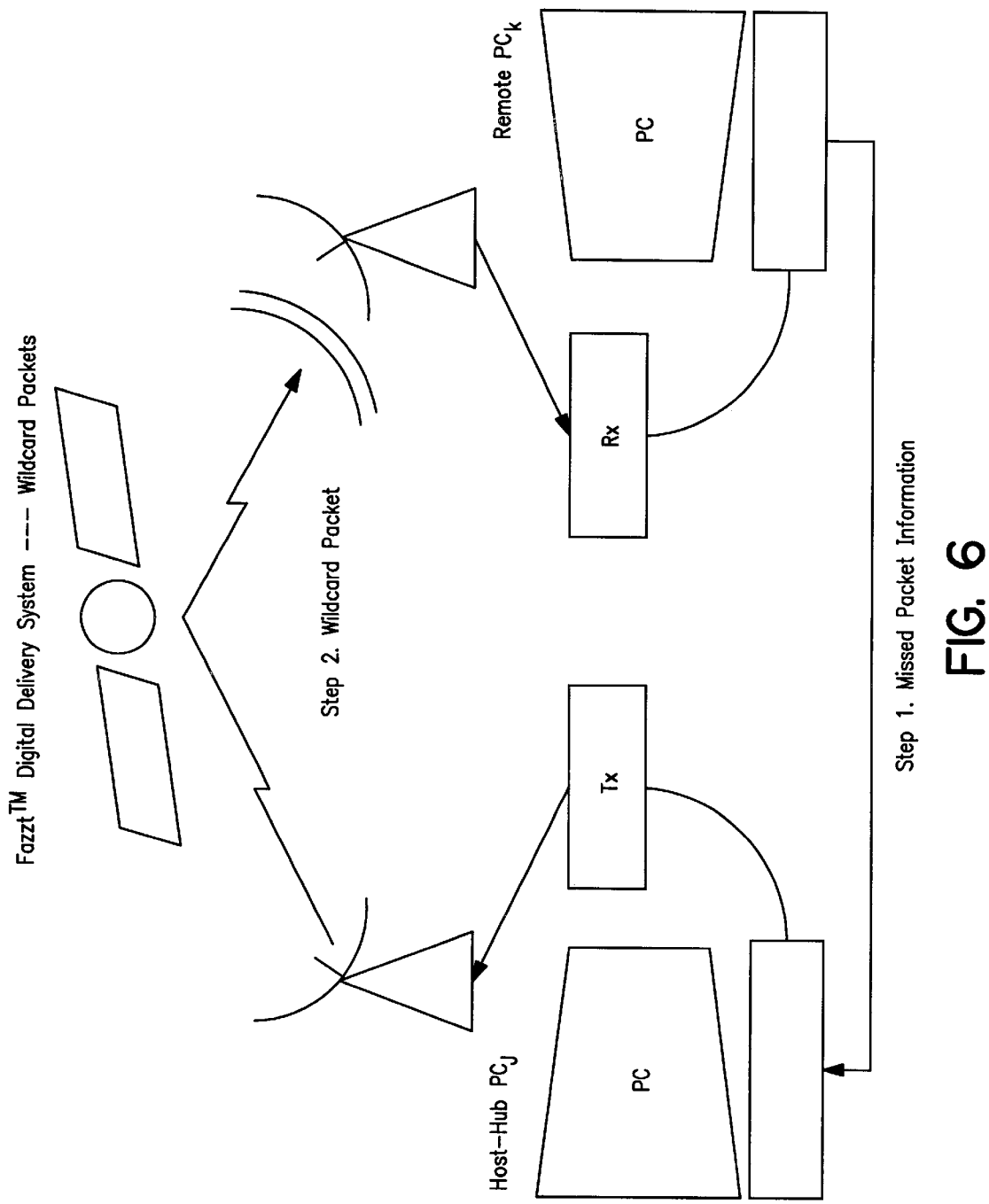
FIG. 6 depicts an example of the use of wildcard packets according to the present invention.
Figure 7:
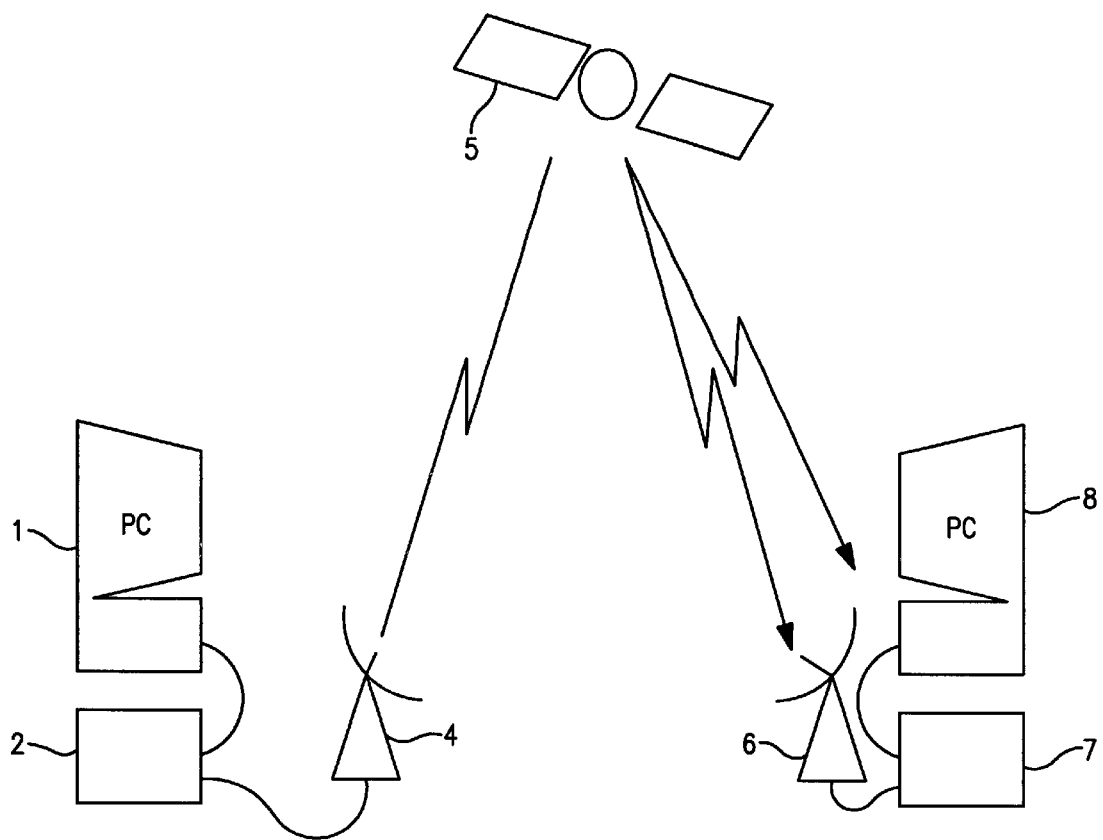
FIG. 7 depicts a block diagram of a one-way broadcast satellite system.

FIG. 6 shows another feature of the present invention. In particular, instead of having each remote subscriber station report back to the host (hub) station which packets were missing and then having the host station retransmit the same to the remote stations (step 1), FP-FEC packets ("wildcard" packets) are instead transmitted, which can be used to replace any missing packet. Generating and transmitting wildcard packets (step 2) is more efficient than retransmitting missed packets when many remote stations are receiving the same broadcast and reporting back to the host station. This is because the host station does not need to know which packets were lost for each remote station, but only how many packets were lost by each remote station. The host station then need only send the exact number of wildcard packets, equal to the worst-case packet loss of all the remote stations reporting back, to all remote stations that reported at least one packet as missing.

Of course, it will be appreciated that the invention may take forms other than those specifically described, and the scope of the invention is to be determined solely by the following claims.

What is claimed is:

1. A method for transmitting information between a host computer and one or more subscriber computers via a satellite, said method comprising the steps of:

inputting one or more live streams of data representing the information into the host computer;

measuring respective pacing factors from the live data streams;

creating respective virtual files from the live data streams;

packet-encoding the virtual files to generate respective streams of encoded packets;

transmitting the encoded packets streams and pacing factors to the subscriber computers via the satellite.

2. A method according to claim 1, further comprising the steps of:

prior to transmission, multiplexing the packets of the encoded packet streams to form one or more pipe streams;

packet-encoding the data pipe streams; and multiplexing the encoded pipe streams to form a multiplexed pipe stream for transmission.

3. A method according to claim 2, wherein in the step of multiplexing the encoded packet streams, a second type of packets is multiplexed along with the packets of the encoded packet streams.

4. A method according to claim 3, wherein the second type of packets is control packets.

5. A method according to claim 3, wherein the second type of packets is authorization packets.

6. A method according to claim 1, further comprising the steps of:

respectively capturing one or more data streams input to the host computer as files;

storing the files offline;

measuring respective pacing factors from the one or more data streams of the offline files;

packet encoding the offline files to generate respective files of encoded packets;

generating one or more streams of encoded packets from the encoded packet files; and in said transmitting step, transmitting the encoded packets streams and pacing factors corresponding to the one or more captured data streams along with the encoded packets streams and pacing factors corresponding to the one or more live data streams.

7. A method according to claims 1 or 6, further comprising the steps of:

storing one or more data files offline;

packet encoding the offline data files to generate respective files of encoded packets; and in said transmitting step, transmitting the packetencoded data files along with the encoded packets streams and pacing factors corresponding to the live data streams.

8. A system for transmitting information between a host computer and one or more subscriber computers via a satellite, said system comprising:

means for inputting one or more live streams of data representing the information into said host computer;

means for measuring respective pacing factors from the live data streams;

means for creating respective virtual files from the live data streams;

means for packet-encoding the virtual files to generate respective streams of encoded packets;

means for transmitting the encoded packets streams and pacing factors to the subscriber computers via the satellite.

* * * * *

UNITED STATES PATENT AND TRADEMARK OFFICE
CERTIFICATE OF CORRECTION

PATENT NO. : 6,272,658 B1
DATED : August 7, 2001
INVENTOR(S) : William Steele et al.

It is certified that error appears in the above-identified patent and that said Letters Patent is hereby corrected as shown below:

Column 5,
Line 7, "effecting" should read -- affecting --; and
Line 11, "the any" should read -- any --.

Column 6,
Line 7, "reffered" should read -- referred to --.

Column 7,
Line 30, "used" should read -- be used --; and
Line 38, "Virtual File" should read -- Virtual File n --.

Column 9,
Line 10, "(Pipe$_{13}$ Tx) 109." should read -- (Pipe_Tx) 109. --;
Line 16, "Patent Application" should read -- Pat. --;
Line 20, "(Pipe$_{13}$ Tx) 109" should read -- (Pipe_Tx) 109 --;
Line 28, "loss" should read -- lost --; and
Line 65, "treated" should read -- be treated --.

Column 11,
Line 33, "packets;" should read -- packets; and --.

Column 12,
Line 26, "packet encoding" should read -- packet-encoding --;
Line 28, "packetencoded" should read -- packet-encoded --; and
Line 42, "packets;" should read -- packets; and --.

Signed and Sealed this

Thirteenth Day of August, 2002

Attest:

Attesting Officer

JAMES E. ROGAN
*Director of the United States Patent and Trademark Office*